(12) United States Patent
Saito

(10) Patent No.: US 12,019,931 B2
(45) Date of Patent: Jun. 25, 2024

(54) INFORMATION PROCESSING APPARATUS, INFORMATION PROCESSING METHOD, AND NON-TRANSITORY COMPUTER-READABLE STORAGE MEDIUM STORING PROGRAM

(71) Applicant: SEIKO EPSON CORPORATION, Tokyo (JP)

(72) Inventor: Kaoru Saito, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/322,430

(22) Filed: May 23, 2023

(65) Prior Publication Data
US 2023/0385001 A1 Nov. 30, 2023

(30) Foreign Application Priority Data

May 26, 2022 (JP) ................................. 2022-085642

(51) Int. Cl.
*G06F 3/12* (2006.01)
*B41J 2/21* (2006.01)

(52) U.S. Cl.
CPC .......... *G06F 3/1258* (2013.01); *B41J 2/2117* (2013.01); *G06F 3/1208* (2013.01); *G06F 3/1215* (2013.01)

(58) Field of Classification Search
CPC .... G06F 3/1215; G06F 3/1219; G06F 3/1242; G06F 3/1258; G06F 3/1208; G06F 3/1279; G06F 3/1256; G06F 3/1285; H04N 1/54; H04N 1/58; B41J 2/2117; B42D 25/00; B42D 25/351; B42D 25/21; B42D 25/45; G09F 13/20; G09F 19/12

USPC ........................................................ 358/1.15
See application file for complete search history.

(56) References Cited

U.S. PATENT DOCUMENTS

| 5,204,055 | A | * | 4/1993 | Sachs | ..................... | B33Y 40/00 264/432 |
| 6,466,210 | B1 | * | 10/2002 | Carlsen | ................ | G06T 15/503 345/641 |
| 9,132,638 | B2 | * | 9/2015 | Otsuka | ........................ | B41J 2/15 |
| 10,596,801 | B2 | * | 3/2020 | Chang | ......................... | B41J 2/21 |
| 11,626,043 | B2 | * | 4/2023 | Horiuchi | ................ | B42D 25/00 40/427 |
| 2009/0213161 | A1 | | 8/2009 | Murai | | |

(Continued)

FOREIGN PATENT DOCUMENTS

JP 2009-230738 A 10/2009

*Primary Examiner* — Negussie Worku
(74) *Attorney, Agent, or Firm* — WORKMAN NYDEGGER

(57) ABSTRACT

An information processing apparatus includes a layer-group determining unit configured to determine, from a printing layer that is a plurality of layers printed using a head that ejects ink, the printing layer including the layer formed by specific color ink and the layer formed by color ink, a layer group that is a plurality of the layers printed in one scanning by the head, a receiving unit configured to receive an input of printing conditions for each of the layer group included in the printing layer and other layers that are zero or more of the layers not included in the layer group, and a setting unit configured to perform setting for applying, to the layer group, a first input value of the printing condition input for the layer group and applying, to the other layers, a second input value of the printing condition input for the other layers.

11 Claims, 8 Drawing Sheets

(56) References Cited

U.S. PATENT DOCUMENTS

| | | | |
|---|---|---|---|
| 2009/0244118 A1* | 10/2009 | Kakutani | B41J 2/2107 |
| | | | 347/6 |
| 2012/0056922 A1* | 3/2012 | Yoshida | B41J 2/2107 |
| | | | 347/105 |
| 2016/0185130 A1* | 6/2016 | Sugai | B41J 11/0015 |
| | | | 347/102 |
| 2018/0186089 A1* | 7/2018 | Chang | B29C 67/0007 |
| 2019/0061402 A1* | 2/2019 | Horiuchi | B41M 5/504 |
| 2021/0335156 A1* | 10/2021 | Horiuchi | G06F 3/1285 |
| 2021/0402810 A1* | 12/2021 | Yamada | B41M 5/0041 |
| 2022/0353386 A1* | 11/2022 | Hori | H04N 1/54 |

* cited by examiner

INFORMATION PROCESSING APPARATUS, INFORMATION PROCESSING METHOD, AND NON-TRANSITORY COMPUTER-READABLE STORAGE MEDIUM STORING PROGRAM

The present application is based on, and claims priority from JP Application Serial Number 2022-085642, filed May 26, 2022, the disclosure of which is hereby incorporated by reference herein in its entirety.

BACKGROUND

1. Technical Field

The present disclosure relates to an information processing apparatus, an information processing method, and a non-transitory computer-readable storage medium storing a program.

2. Related Art

There has been a printing apparatus that prints a stacked plurality of layers including a layer formed by color ink and a layer formed by specific color ink. In the following explanation, printing the stacked plurality of layers including the layer formed by the color ink and the layer formed by the specific color ink is referred to as multilayer printing. JP-A-2009-230738 (Patent Literature 1) discloses a printing apparatus that jets a plurality of inks in designated order when printing a plurality of layers.

In the related art, flexibility in setting printing conditions has been low and convenience for a user has been low.

SUMMARY

In view of the problems described above, an information processing apparatus includes: a layer-group determining unit configured to determine, from a printing layer that is a plurality of layers printed using a head that ejects ink, the printing layer including the layer formed by specific color ink and the layer formed by color ink, a layer group that is a plurality of the layers printed in one scanning by the head; a receiving unit configured to receive an input of printing conditions for each of the layer group included in the printing layer and other layers that are zero or more of the layers not included in the layer group; and a setting unit configured to perform setting for applying, to the layer group, a first input value of the printing condition input for the layer group and applying, to the other layers, a second input value of the printing condition input for the other layers.

BRIEF DESCRIPTION OF THE DRAWINGS

FIG. 1 is a diagram showing an example of configurations of an information processing apparatus and the like.

DESCRIPTION OF EXEMPLARY EMBODIMENTS

Embodiments of the present disclosure are explained below according to order described below.
 (1) First Embodiment
  (1-1) Configuration of an information processing apparatus
  (1-2) Registration processing
 (2) Second Embodiment
 (3) Third Embodiment
 (4) Fourth Embodiment
 (5) Other embodiments

Figure 1:
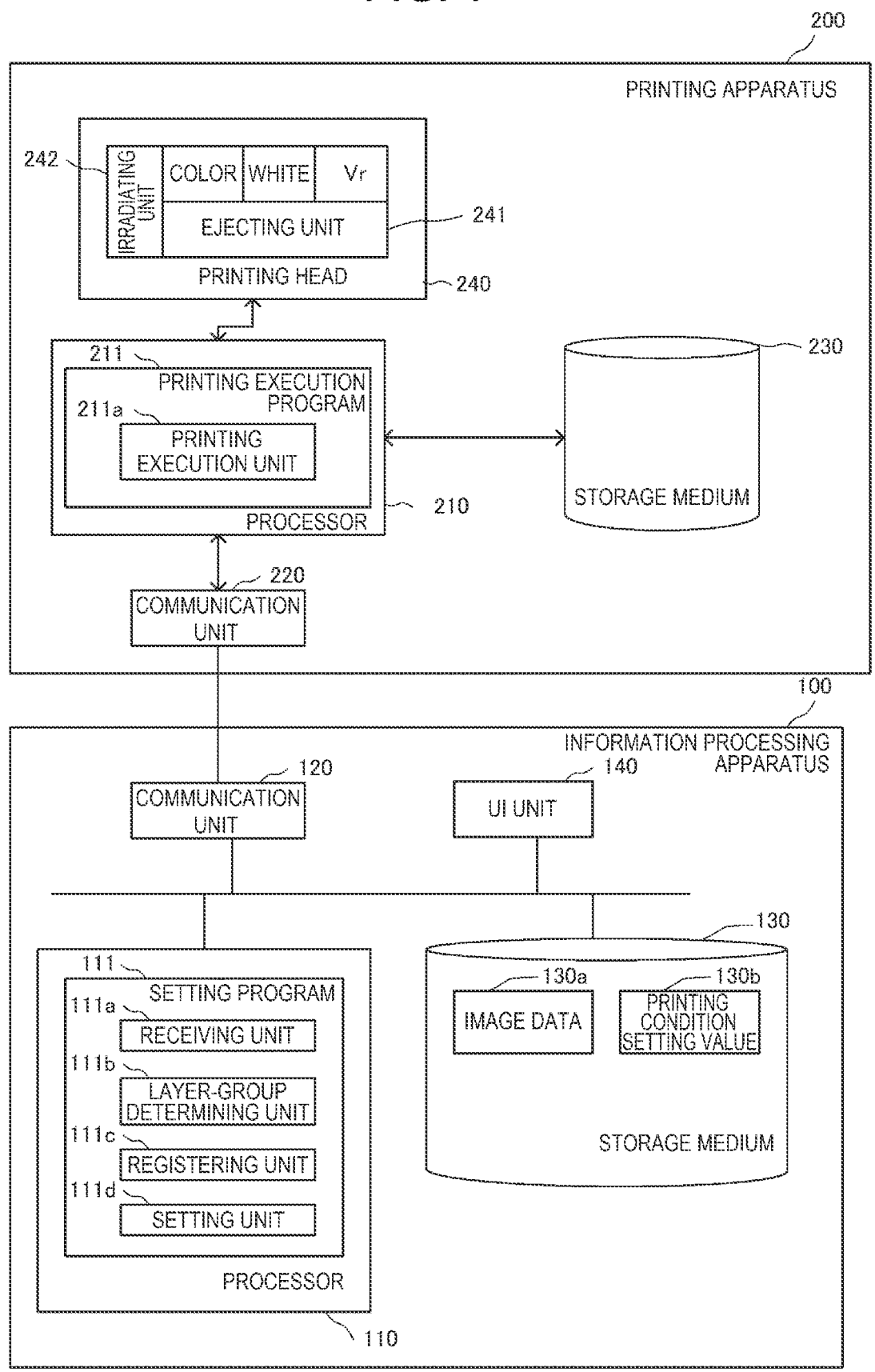

(1) FIRST EMBODIMENT (1-1) Configuration of an Information Processing Apparatus FIG. 1 is a diagram showing an example of configurations of an information processing apparatus 100 and a printing apparatus 200 according to a first embodiment. The information processing apparatus 100 in this embodiment is an information processing apparatus that controls the printing apparatus 200 and is, for example, a personal computer, a tablet apparatus, or a smartphone. The printing apparatus 200 is a printing apparatus that prints, according to an instruction from the information processing apparatus 100, an image on a printing medium (for example, a transparent or nontransparent acrylic plate, a glass plate, a medium made of resin (for example, a smartphone case made of resin), or printing paper). In this embodiment, the printing apparatus 200 performs printing on the printing medium using predetermined inks. In this embodiment, the predetermined inks are color inks (inks of colors of cyan (C), magenta (M), yellow (Y), and black (K)) and specific color inks. The specific color inks are inks used for expression of colors that cannot be expressed by the color inks and imparting of effects such as gloss and are, in this embodiment, white ink and varnish ink. The inks used by the printing apparatus 200 in this embodiment are inks that are hardened by irradiation of an ultraviolet ray. In this embodiment, it is assumed that the printing apparatus 200 is an inkjet type.

Figure 2:
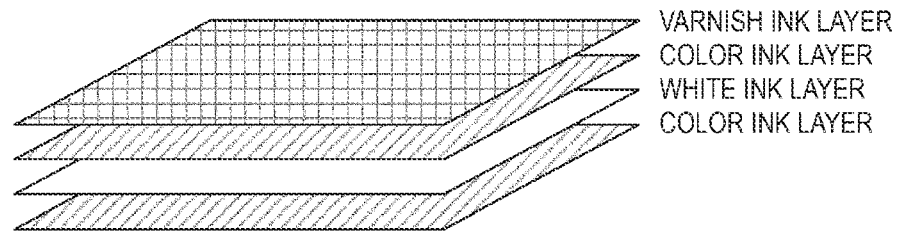
FIG. 2 is a diagram showing an overview of an example of a plurality of layers to be printed.

In this embodiment, the printing apparatus 200 prints a plurality of layers on a printing medium. An example of a configuration of a plurality of layers to be printed on a transparent printing medium by the printing apparatus 200 is shown in FIG. 2. In the example shown in FIG. 2, the plurality of layers are stacked, in order from the bottom, in order of a layer formed by the color ink (hereinafter, color ink layer), a layer formed by the white ink (hereinafter, white ink layer), a color ink layer, and a layer formed by the varnish ink (hereinafter, varnish ink layer). The bottom means a direction of the printing medium viewed from the layers to be printed. The color ink layer in the top layer is visually recognized from the front surface of the printing medium. The color ink layer in the bottom layer is visually recognized from the rear surface of the printing medium. In the following explanation, layers formed by the specific color inks such as the white ink and the varnish ink are referred to as specific color ink layers. Therefore, the white ink layer and the varnish ink layer are examples of the specific color ink layer.

In this embodiment, the printing apparatus 200 performs printing by ejecting ink to a printing medium and irradiating the ejected ink with an ultraviolet ray. The information processing apparatus 100 and the printing apparatus 200 are communicably connected to each other by wire or radio. The information processing apparatus 100 and the printing apparatus 200 may be integrated hardware. The printing apparatus 200 may be controlled from the information processing apparatus 100 installed in the printing apparatus 200.

Hardware included in the information processing apparatus 100 and the printing apparatus 200 is explained.

The information processing apparatus 100 includes a processor 110, a communication unit 120, a storage medium 130, and a UI unit 140. The information processing apparatus 100 includes a random access memory (RAM) and a read only memory (ROM) not shown in FIG. 1. The processor 110 executes various programs stored in the ROM, the storage medium 130, and the like to control the information processing apparatus 100. The processor 110 may be configured by a single chip or may be configured by a plurality of chips. In this embodiment, the processor 110 is assumed to be a central processing unit (CPU). However, the processor 110 may be configured by an ASIC or the like or may be configured by the CPU and the ASIC. The communication unit 120 includes a circuit used for communication conforming to wired or wireless various communication protocols between the communication unit 120 and external equipment such as the printing apparatus 200. The storage medium 130 stores various programs such as a setting program 111 for executing processing for controlling printing via the printing apparatus 200 and various kinds of information such as image data 130a and printing condition setting values 130b.

The image data 130a is data of an image of a plurality of layers to be printed. In the following explanation, the plurality of layers to be printed are referred to as printing layer. In this embodiment, data of the layers included in the image data 130a is data indicating an image to be printed. Data of a color ink layer included in the image data 130a is RGB data representing, in gradation values of RGB three channels, pixels of an image divided by a predetermined number of pixels (for example, 640×480 or 1200×1600). Data of a white ink layer and a varnish ink layer included in the image data 130a is data representing, in gradation values of one channel indicating concentration, the pixels of the image divided by the predetermined number of pixels.

The printing condition setting values 130b are preset values of printing conditions that can be collectively set for all the layers of the printing layer. The preset values are values obtained by collecting setting values of printing conditions for the layers of the printing layer. In the following explanation, the preset values are referred to as printing condition preset values. The printing conditions are conditions relating to printing and are, in this embodiment, types of inks used for formation of the layers and printing qualities of the layers. The types of the inks are a concept indicating which of the color inks, the white ink, the varnish ink, and the like the inks are. The printing qualities are parameters relating to quality of printing processing and are, for example, a media profile, a concentration value of ink, resolution of an image to be input (resolution in data of image data to be printed), a parameter concerning printing speed, resolution of an image to be output (an image to be printed), a control parameter of the printing apparatus 200 concerning quality of the image to be output. In this embodiment, the parameter concerning the printing speed includes the number of printing paths. The media profile is color conversion information (for example, a color conversion table) for reproducing a target color with ink used for printing irrespective of a characteristic of a printing medium. The concentration value of the ink is an indicator value indicating concentration of the ink to be printed on the printing medium. The concentration value of the ink is used for controlling an amount of the ink ejected from a printing head 240. In this embodiment, information concerning preset values of printing quality that can be set for a single layer is stored in advance in the storage medium 130. In the following explanation, the preset values of the printing quality that can be set for the single layer are referred to as single layer preset values.

As image quality of a printing result is higher, since a time required for printing increases, printing speed is lower. In the following explanation, the image quality of the printing result is referred to as printing image quality. Conversely, by reducing the printing image quality, it is possible to reduce the time required for the printing and increase the printing speed. Therefore, in this embodiment, as the single layer preset values, single layer preset values with parameters adjusted according to a use (for example, parameters adjusted by prioritizing the printing image quality over the printing speed or parameters adjusted by prioritizing the printing speed over the printing image quality) are prepared.

In this embodiment, information concerning preset values of printing conditions applicable to a plurality of layers that can be printed in one scanning by the printing head 240 of the printing apparatus 200 explained below is stored in advance in the storage medium 130. In the following explanation, a plurality of layers concurrently printed in one scanning by the printing head 240 is referred to as layer group. The preset values of the printing conditions applicable to the layer group indicate information concerning inks used for formation of the layers of the layer group and a single layer preset value applied to the entire layer group. In the following explanation, the preset values of the printing conditions applicable to the layer group are referred to as layer group preset values. The layer group preset values are also regarded as printing condition preset values applied to the layer group.

In this embodiment, the processor 110 receives designation of a value of printing quality from a user via the UI unit 140, generates single layer preset values based on the designated value, and registers the generated single layer preset values in the storage medium 130. More specifically, the processor 110 receives, based on operation of the UI unit 140 by the user, designation of values of parameters of the printing quality (a media profile, a concentration value of ink, resolution of an image to be input, a parameter concerning printing speed, resolution of an image to be output, and the like). The processor 110 collects the designated values to generate single layer preset values and stores the generated single layer preset values in the storage medium 130. The processor 110 may receive designation of values of a part of the parameters of the printing quality. In that case, for the other parameters, the processor 110 assumes that predetermined initial values are designated, generates single layer preset values, and stores the generated single-layer preset values in the storage medium 130. The processor 110 may receive, based on operation of the UI unit 140 by the user, for the single layer preset values already generated, an instruction for update of values of a part or all of the parameters. In that case, the processor 110 updates, according to the instruction, the values of the parameters in the single layer preset values corresponding to the instruction. In this way, the processor 110 can improve flexibility of setting of printing quality for a single layer.

The UI unit 140 includes an input unit that receives an input from the user such as an operation unit such as a mouse, a keyboard, a touch pad, or a touch panel, a display unit such as a monitor or a touch panel, and an output unit used for presenting information to the user such as a speaker.

The printing apparatus 200 includes a processor 210, a communication unit 220, a storage medium 230, and a printing head 240. The printing apparatus 200 includes a RAM and a ROM not shown in FIG. 1. The processor 210 executes various programs stored in the ROM, the storage medium 230, and the like to control the printing apparatus 200. The processor 210 may be configured by a single chip or may be configured by a plurality of chips. In this embodiment, the processor 210 is assumed to be a CPU. However, the processor 210 may be configured by an ASIC or the like or may be configured by the CPU and the ASIC. The communication unit 220 includes a circuit used for communication conforming to wired or wireless various communication protocols between the communication unit 220 and external equipment such as the information processing apparatus 100. The storage medium 230 stores various programs such as a printing execution program 211 for controlling executing of printing and various kinds of information.

Figure 3:
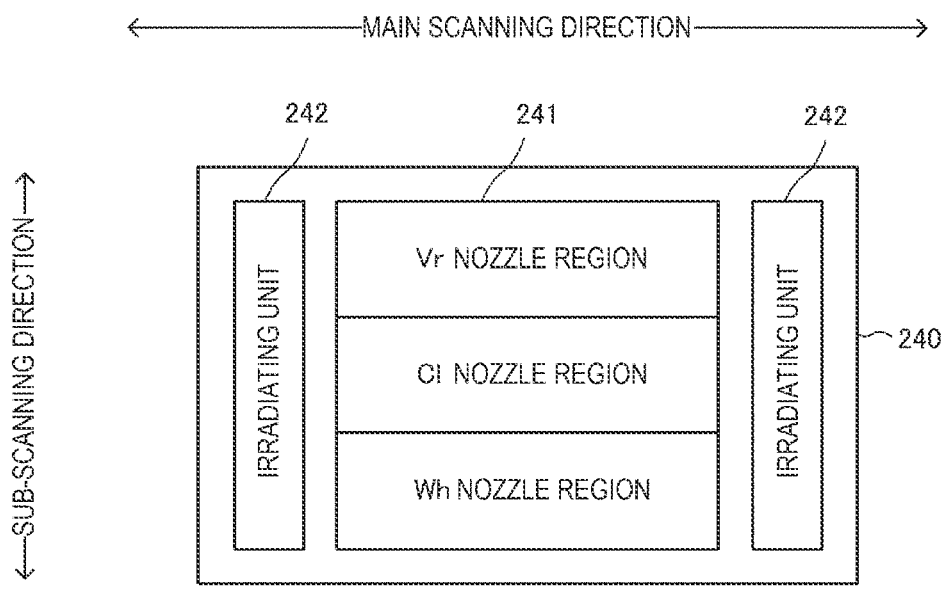
FIG. 3 is a diagram for explaining a printing head.

The printing head 240 performs ejection of ink to a printing medium and irradiation of an ultraviolet ray on the printing medium. The processor 210 performs the ejection of the ink to the printing medium and the irradiation of the ultraviolet ray on the printing medium while moving the printing head 240 via a driving mechanism for the printing head 240. The processor 210 repeats printing in units of a line on the printing medium via the printing head 240 to perform printing. In the following explanation, a direction of the line is referred to as main scanning direction. In the following explanation, a direction perpendicular to the main scanning direction and parallel to the printing medium disposed in the printing is referred to as sub-scanning direction. In the following explanation, printing of one line performed by the printing head 240 in printing while moving from an end to the other end of a printing region in the main scanning direction on the printing medium is referred to one printing path. The number of times of printing paths required for printing of the same region in the printing region is referred to as number of printing paths. The printing head 240 includes an ejecting unit 241 used for ejection of various inks and irradiating units 242 that perform irradiation of an ultraviolet ray on ink ejected by the ejecting unit 241. A configuration of the printing head 240 in this embodiment is shown in FIG. 3. FIG. 3 is a diagram showing a state in which the printing head 240 is viewed from a perpendicular direction when a setting surface of the printing medium in the printing apparatus 200 is assumed to be parallel to the horizontal direction. In the ejecting unit 241, a plurality of nozzles used for ejection of the inks such as the color inks (CMYK), the white ink, and the varnish ink are formed. The ejecting unit 241 ejects the inks to the printing medium to apply the inks to the printing medium. As shown in FIG. 3, in the ejecting unit 241, a region where a nozzle for varnish ink ejection (referred to as Vr nozzle) is formed (referred to as Vr nozzle region), a region where a nozzle for color ink ejection (referred to as Cl nozzle) is formed (referred to as Cl nozzle region), and a region where a nozzle for white ink ejection is formed (referred to as Wh nozzle) is formed (referred to as Wh nozzle region) are disposed in different positions in the sub-scanning direction to be adjacent to one another in the sub-scanning direction. In this embodiment, widths in the sub-scanning direction of the nozzles are the same. In this embodiment, a direction of the Wh nozzle region viewed from the Cl nozzle region in the sub-scanning direction is referred to as front direction and a direction of the Vr nozzle region viewed from the Cl nozzle region in the sub-scanning direction is referred to as rear direction. The Vr nozzle region, the Cl nozzle region, and the Wh nozzle region are different positions in the sub-scanning direction. Therefore, the printing head 240 can eject a plurality of inks among the varnish ink, the color inks, and the white ink to the printing medium not to overlap one another in one scanning in the main scanning direction.

In this embodiment, in principle (that is, as long as a change of a moving direction in the sub-scanning direction of the printing head 240 is not instructed in printing), in printing, the processor 210 performs the printing while moving the printing head 240 in the front direction. That is, the processor 210 performs the printing by repeatedly moving the printing head 240 in the front direction from the end portion in the rear direction in a printing region of a printing medium and causing the printing head 240 to perform scanning in the main scanning direction. However, in principle, the processor 210 may perform the printing by repeatedly moving the printing head 240 in the rear direction from the end portion in the front direction in the printing region and causing the printing head 240 to perform the scanning in the main scanning direction. The irradiating units 242 are lamps that are disposed on both the sides in the main scanning direction of the ejecting unit 241 and irradiate an ultraviolet ray. In the scanning of the printing head 240, the processor 210 irradiates, with the ultraviolet ray, via the irradiating units 242 located in a scanning direction rear part of the printing head 240, ink ejected to the printing medium by the ejecting unit 241.

Figure 4:
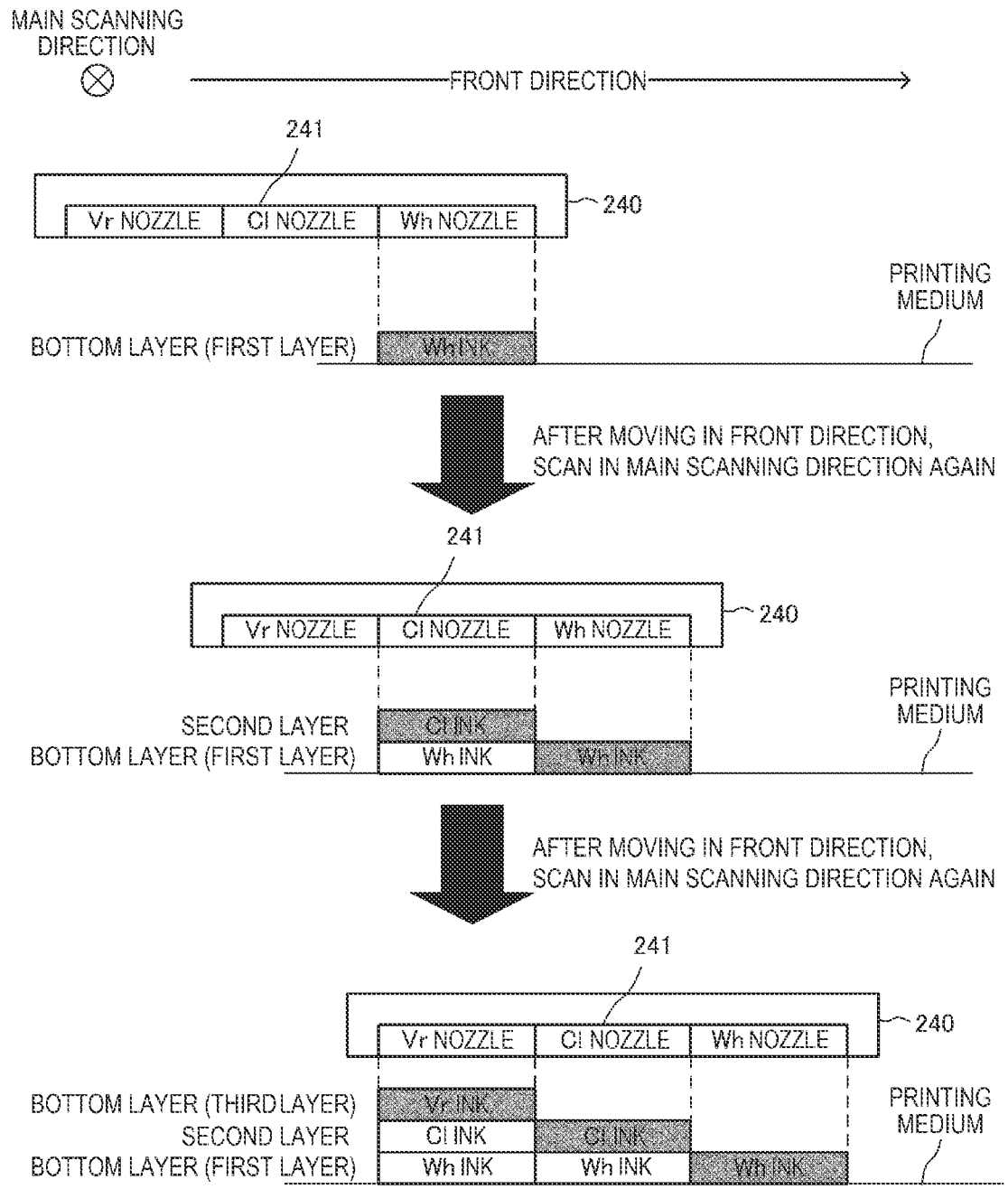
FIG. 4 is a diagram for explaining printing of a layer group.

Processing for printing a plurality of layers in one scanning using the printing head 240 is explained with reference to FIG. 4. In the following explanation, a layer group of three layers including a white ink layer, a color ink layer, and a varnish ink layer are printed in the same scanning by the printing head 240. In FIG. 4, inks ejected to a printing medium are indicated by rectangles. Inks ejected most newly are indicated by rectangles with gray backgrounds.

First, the printing head 240 ejects the white ink (in FIG. 4, described as Wh ink) forming the bottom layer to the end portion in the sub-scanning direction of a printing region in the printing medium. The printing head 240 moves in the front direction by a predetermined distance and ejects the white ink forming the bottom layer and the color ink (in FIG. 4, described as Cl ink) forming the second layer from the bottom while performing scanning in the main scanning direction again. The color ink ejected here is ejected on the white ink ejected in the immediately preceding scanning. Consequently, a color ink layer stacked on a white ink layer is formed. The printing head 240 moves in the front direction by the predetermined distance and ejects the white ink forming the bottom layer, the color ink forming the second layer from the bottom, and the varnish ink forming the top layer while performing the scanning in the main scanning direction again. The varnish ink ejected here is ejected on the color ink ejected in the immediately preceding scanning. Consequently, a varnish ink layer stacked on the color ink layer stacked on the white ink layer is formed. Thereafter, the printing head 240 repeats the ejection of the inks while moving in the front direction by the width of the nozzle. In this way, the three layers are formed by the same scanning by the printing head 240.

The plurality of layers that the printing head 240 can form in one scanning in the main scanning direction are decided according to arrangement order in the sub-scanning direction of the nozzles that eject the inks in the ejecting unit 241 of the printing head 240. Nozzle regions in the ejecting unit 241 are arranged in the order of a Vr nozzle region, a Cl nozzle region, and a Wh nozzle region in the front direction. The inks corresponding to the nozzles are arranged in this arrangement order as the varnish ink, the color ink, and the white ink. When the printing head 240 performs printing while moving in the front direction, a plurality of layers in which a layer formed by the ink arranged ahead in this arrangement order is stacked on a layer formed by the ink arranged behind in this arrangement order can be formed by one scanning. When the printing head 240 performs printing while moving in the rear direction, a plurality of layers in which a layer formed by the ink arranged behind in this arrangement order is stacked on a layer formed by the ink arranged ahead in this arrangement order can be formed by one scanning.

That is, when the printing head 240 performs the printing while moving in the front direction, three layers of the white ink layer, the color ink layer, and the varnish ink layer stacked in order from the bottom, two layers of the white ink layer and the color ink layer stacked in order from the bottom, two layers of the white ink layer and the varnish ink layer stacked in order from the bottom, and two layers of the color ink layer and the varnish ink layer stacked in order from the bottom can be formed by one scanning.

When the printing head 240 performs the printing while moving in the rear direction, three layers of the varnish ink layer, the color ink layer, and the white ink layer stacked in order from the bottom, two layers of the color ink layer and the white ink layer stacked in order from the bottom, two layers of the varnish ink layer and the white ink layer stacked in order from the bottom, and two layers of the varnish ink layer and the color ink layer stacked in order from the bottom can be formed by one scanning.

The varnish ink layer is used for the purpose of protection and glossing of a surface and it is hardly assumed that the varnish ink layer is formed in a place other than the surface. Therefore, in this embodiment, it is assumed that the other layers are not stacked on the varnish ink layer. It is also hardly assumed that the varnish ink layer is stacked on the white ink layer. Therefore, in this embodiment, it is assumed that the varnish ink layer is not stacked on the white ink layer. However, the other layers may be allowed to be stacked on the varnish ink layer. The varnish ink layer may be allowed to be stacked on the white ink layer.

In this embodiment, a plurality of layers that can be a layer group are two layers in which the color ink layer and the white ink layer are stacked in order from the bottom, two layers in which the white ink layer and the color ink layer are stacked in order from the bottom, two layers in which the color ink layer and the varnish ink layer are stacked in order from the bottom, and three layers in which the white ink layer, the color ink layer, and the varnish ink layer are stacked in order from the bottom. In the following explanation, a layer group in which the color ink layer and the white ink layer are stacked in order from the bottom is referred to as color/white layer group. In the following explanation, a layer group in which the white ink layer and the color ink layer are stacked in order from the bottom is referred to as white/color layer group. In the following explanation, a layer group in which the color ink layer and the varnish ink layer are stacked in order from the bottom is referred to as color/varnish layer group. In the following explanation, a layer group in which the white ink layer, the color ink layer, and the varnish ink layer are stacked in order from the bottom is referred to as white/color/varnish layer group. In this embodiment, layer group preset values respectively applicable to the white/color layer group, the color/white layer group, the color/varnish layer group, and the white/color/varnish layer group are stored in the storage medium 130 in advance.

In the following explanation, when the printing head 240 performs printing while moving in the front direction, a layer group preset value applicable to a layer group that can be formed in one scanning by the printing head 240 is referred to as front-direction preset value. In this embodiment, layer group preset values applicable to the white/color layer group, the color/varnish layer group, and the white/color/varnish layer group are front-direction preset values. In the following explanation, when the printing head 240 performs printing while moving in the rear direction, a layer group preset value applicable to a layer group that can be formed in one scanning by the printing head 240 is referred to as rear-direction preset value. In this embodiment, a layer group preset value applicable to the color/white layer group is a rear-direction preset value.

High image quality is not requested for the varnish ink layer. It is assumed that printing quality with lower printing image quality is applied to the varnish ink layer compared with the color ink layer and the white ink layer. Therefore, in this embodiment, a single layer preset value with printing image quality equal to or higher than a predetermined level is absent in a single layer preset value applicable to the varnish ink layer. As a result, a layer group preset value with printing image quality equal to or higher than the predetermined level is also absent in a layer group preset value applicable to the layer group including the varnish ink layer. That is, printing quality with printing image quality equal to or higher than the predetermined level cannot be applied to the other layers in the layer group including the varnish ink layer.

Subsequently, functions of the information processing apparatus 100 and the printing apparatus 200 are explained.

The processor 110 of the information processing apparatus 100 executes the setting program 111 stored in the storage medium 130 to function as a receiving unit 111*a*, a layer-group determining unit 111*b*, a registering unit 111*c*, and a setting unit 111*d*.

The receiving unit 111*a* has a function of receiving an input of printing conditions for each of the layers of the printing layer including the specific color ink layer and the color ink layer. In this embodiment, the receiving unit 111*a* has a function of receiving an input of printing conditions for each of a layer group determined by a function of the layer-group determining unit 111*b* explained below and zero or more other layers not included in a layer group in the printing layer. In the following explanation, other layers different from the layer group in the printing layer are referred to as other layers. The other layers are single layers not collected as the layer group in the printing layer. When the printing layer is configured by only a plurality of layer groups, the other layers are absent.

The processor 110 displays, with the function of the receiving unit 111*a*, on the UI Unit 140, a screen used for an input of a layer configuration of a plurality of layers imagined as the printing layer (hereinafter referred to as imaginary layer) and printing conditions for the layers of the imaginary layer. The layer configuration is a concept indicating, in a stacked plurality of layers, a layer formed by ink of which type is stacked in which order. In this embodiment, the processor 110 displays, as the screen, an input screen 300 shown in FIG. 5. The input screen 300 includes an addition button 301 used for addition of a layer to the imaginary layer, a deletion button 302 used for deletion of a layer from the imaginary layer, and a registration button 303 used for registration of printing condition preset values. The input screen 300 includes a checkbox 304 for instructing a change to setting for an increase in speed of printing and an input field 305 used to designate a policy for determination of a layer group for an increase in speed of printing.

The processor 110 sets the number of layers included in the imaginary layer based on selection of the addition button 301 and the deletion button 302. More specifically, when detecting the selection of the addition button 301 based on operation of the UI unit 140 by the user, the processor 110 assumes that one layer is added above the top layer of the imaginary layer and adds and displays an input region 310 corresponding to the added layer in the input screen 300. "Above" means "above" in the case in which a printing medium is below when viewed from a layer to be printed. When no layer is included in the imaginary layer, the processor 110 adds one layer as a layer of the bottom layer and adds and displays the input region 310 corresponding to the added layer in the input screen 300. When detecting the selection of the deletion button 302 based on operation of the UI unit 140 by the user, the processor 110 assumes that the top layer included in the imaginary layer is deleted and deletes the input region 310 corresponding to the deleted layer from the input screen 300.

That is, every time the user selects the addition button 301, the input region 310 for a layer added to the imaginary layer increases. When the user selects the deletion button 302, the input region 310 for a layer deleted from the imaginary layer decreases. An example shown in FIG. 5 indicates a situation in which six input regions 310 are displayed as a result of selecting the addition button 301 six times. In the example shown in FIG. 5, a first layer is the bottom layer, a second layer is a layer above the first layer, a third layer is a layer above the second layer, a fourth layer is a layer above the third layer, a fifth layer is a layer above the fourth layer, and a sixth layer is the top layer.

The input region 310 is a region used for an input of printing conditions for a layer corresponding to the input region 310 and includes input fields 311 and 312. The input field 311 is used for inputting a type of ink used for formation of a layer corresponding to the input field 311. The input field 312 is used for inputting printing quality of a layer corresponding to the input field 312.

In this embodiment, when detecting selection of the input field 311, the processor 110 presents, as a pulldown menu, choices that can be input as types of inks used for formation of a layer corresponding to the input field 311. In this embodiment, the processor 110 presents the color ink, the white ink, and the varnish ink as the choices. The processor 110 receives, via the UI unit 140, designation of ink used for the formation of the corresponding layer out of the presented choices. The processor 110 receives the ink of the designated choice as an input value of the ink used for the formation of the corresponding layer. In the example shown in FIG. 5, the color ink is input for the first layer, the white ink is input for the second layer, the color ink is input for the third layer, and the white ink is input for the fourth layer. The color ink is input for the fifth layer and the varnish ink is input for the sixth layer.

In this embodiment, when detecting selection of the input field 312, the processor 110 presents, as a pulldown menu, choices that can be input as printing qualities of a layer corresponding to the input field 312. In this embodiment, the processor 110 presents, as the choices, single layer preset values stored in the storage medium 130 (predetermined single layer preset values and single layer preset values generated by the processor 110). The processor 110 receives, via the UI unit 140, designation of printing quality of the corresponding layer out of the presented choices. The processor 110 receives the designated printing quality of the choice as an input value of the printing quality of the corresponding layer.

When detecting selection of the input field 305, the processor 110 presents, as a pulldown menu, choices that can be input as policies of an increase in speed of printing. In this embodiment, the processor 110 presents, as the choices, speed priority that is a policy for prioritizing printing speed over printing image quality and image quality priority that is a policy for prioritizing printing image quality over printing speed. The processor 110 receives, via the UI unit 140, designation of a policy out of the presented choices. The processor 110 receives the designated policy as designation of a policy of an increase in speed of printing. In the example shown in FIG. 5, the speed priority is designated.

The layer-group determining unit 111*b* is explained.

The layer-group determining unit 111*b* has a function of determining, from the printing layer, a layer group to be printed in one scanning by the printing head 240.

When detecting an input of a check to the checkbox 304 via the UI unit 140, the processor 110 determines, with the function of the layer-group determining unit 111*b*, according to the policy designated in the input field 305, from the imaginary layer, a layer group to be formed in one scanning by the printing head 240. In this embodiment, the processor 110 determines, as a layer group, a portion to which the layer group preset values in the imaginary layer are applicable and enables the portion of the layer group to be also formed in one scanning by the printing head 240 to achieve an increase in speed of printing.

In this embodiment, when the speed priority is designated in the input field 305, the processor 110 determines a layer group from the imaginary layer in a mode for prioritizing printing speed (hereinafter, speed priority mode). Determination processing for a layer group in the speed priority mode is explained below.

In the speed priority mode, the processor 110 collects as many layers as possible as a layer group to improve printing speed. Specifically, the processor 110 collects layers as explained below.

The processor 110 specifies, as candidates of a layer group to be determined in the imaginary layer, layer groups to which the layer group preset values prepared in advance (the layer group preset values stored in the storage medium 130) are applicable. The processor 110 determines a priority level as explained below for each of the specified candidates. The priority level is an indicator value indicating how preferentially the candidate layer group corresponding to the priority level is provided in the imaginary layer. The processor 110 sets the priority level higher for a candidate having a larger number of layers. As the number of layers collected as a layer group is larger, a larger number of layers can also be formed by one scanning by the printing head 240. Therefore, a time required for printing may be short and a printing time is improved. Concerning candidates having the same number of layers, the processor 110 sets a priority level higher for a candidate corresponding to the front-direction preset value than a candidate corresponding to the rear-direction preset value. When the printing head 240 performs printing while moving in the front direction and, at the same time, performs printing while moving in the rear direction, it is more difficult to align the printing head 240. This is likely to lead to deterioration in printing accuracy. Therefore, the processor 110 can reduce a situation of the deterioration in the printing accuracy by aligning a moving direction in the sub-scanning direction of the printing head 240 in printing with the front direction as in the principle case. However, when moving the printing head 240 in the rear direction to perform printing in principle, the processor 110 may set a priority level higher for the candidate corresponding to the rear-direction preset value than the candidate corresponding to the front-direction preset value. Concerning candidates corresponding to front-direction preset values having the same number of layers or candidates corresponding to rear-direction preset values having the same number of layers, the processor 110 sets a priority level higher for a candidate not including the varnish ink layer than a candidate including the varnish ink layer. In this embodiment, a single layer preset value having printing image quality higher than the predetermined level is absent in single layer preset values applicable to the varnish ink layer. Therefore, a situation occurs in which a single layer preset value having printing image quality higher than the predetermined level cannot be set for a layer group including the varnish ink layer and printing image quality cannot be improved for a layer different from the varnish ink layer in the layer group. Therefore, the processor 110 can reduce such a situation by setting a priority level higher for the candidate not including the varnish ink layer than the candidate including the varnish ink layer.

In this embodiment, the layer groups to which the layer group preset values stored in the storage medium 130 are applicable are the four layer groups of the color/white layer group, the white/color layer group, the color/varnish layer group, and the white/color/varnish layer group. Therefore, the processor 110 specifies the four layer groups as candidates of the layer group determined in the imaginary layer. The processor 110 sets a priority level highest for a candidate that is the white/color/varnish layer group having the largest number of layers. The processor 110 sets a priority level second highest for a candidate that is the white/color layer group corresponding to the front-direction preset value and not including the varnish ink layer. The processor 110 sets a priority level third highest for a candidate that is the color/varnish layer group corresponding to the front-direction preset value and including the varnish ink layer. The processor 110 sets a priority level lowest for a candidate that is the color/white layer group corresponding to the rear-direction preset value.

The processor 110 selects the specified candidates one by one in descending order of the priority levels and performs processing explained below for the selected candidates. In the following explanation, an immediately preceding selected candidate is referred to as selected candidate.

The processor 110 specifies all portions having the same layer configuration as the selected candidate out of portions not determined as layer groups in the imaginary layer. The processor 110 determines the specified portions as layer groups. In this embodiment, first, the processor 110 selects the white/color/varnish layer group as the selected candidate. In the example shown in FIG. 5, the processor 110 specifies the fourth to sixth layers in the imaginary layer as a portion having the same layer configuration as the selected candidate and determines the portion as a layer group. Subsequently, the processor 110 selects the white/color layer group as the selected candidate. In the example shown in FIG. 5, the processor 110 specifies the second and third layers in the imaginary layer as a portion having the same layer configuration as the selected candidate and determines the portion as a layer group. Subsequently, the processor 110 selects the color/varnish layer group as the selected candidate. In the example shown in FIG. 5, since a portion having the same layer configuration as the selected candidate is absent in the portions not determined as layer groups in the imaginary layer, the processor 110 does not determine a layer group. Subsequently, the processor 110 selects the color/white layer group as the selected candidate. In the example shown in FIG. 5, since a portion having the same layer configuration as the selected candidate is absent in the portions not determined as layer groups in the imaginary layer, the processor 110 does not determine a layer group.

The processor 110 executes the processing explained above for each of the specified candidates to determine a layer group in the imaginary layer.

The processing in the speed priority mode is as explained above.

In this embodiment, when the quality priority is designated in the input field 305, the processor 110 determines a layer group from the imaginary layer in a mode for prioritizing printing image quality (hereinafter, image quality priority mode). Determination processing for a layer group in the image quality priority mode is explained below.

In the image quality priority mode, the processor 110 more preferentially determines, in the imaginary layer, a layer group in which higher printing quality can be set. Specifically, the processor 110 determines a layer group as explained below.

The processor 110 specifies, as candidates of a layer group determined in the imaginary layer, layer groups to which the layer group preset values stored in the storage medium 130 are applicable. The processor 110 determines priority levels for the specified candidates as explained below. The priority levels are indicator values indicating how preferentially the candidate layer groups corresponding to the priority levels are provided in the imaginary layer. In this embodiment, a layer group having the largest number of layers (a layer group of three layers) includes the varnish ink layer. Therefore, a value of printing quality with printing image quality higher than the predetermined level cannot be applied to the layer group. Therefore, by setting a priority level higher for a candidate that is a layer group in which the number of layers is two than a candidate that is the layer group of the three layers, the processor 110 can reduce a situation in which the layer group of the three layers is determined in the imaginary layer and image quality of a printing result is deteriorated.

As in the speed priority mode, concerning candidates having the same number of layers, the processor 110 sets a priority level higher for a candidate corresponding to the front-direction preset value than a candidate corresponding to the rear-direction preset value. As in the speed priority mode, concerning candidates corresponding to front-direction preset values having the same number of layers or candidates corresponding to rear-direction preset values having the same number of layers, the processor 110 sets a priority level higher for a candidate not including the varnish ink layer than a candidate including the varnish ink layer.

In this embodiment, the layer groups to which the layer group preset values stored in the storage medium 130 are applicable are the four layer groups of the color/white layer group, the white/color layer group, the color/varnish layer group, and the white/color/varnish layer group. Therefore, the processor 110 specifies the four layer groups as candidates of the layer group determined in the imaginary layer. The processor 110 sets a priority level highest for a candidate that is the white/color layer group corresponding to the front-direction preset value and configured by the two layers not including the varnish ink layer. The processor 110 sets a priority level second highest for a candidate that is the color/varnish layer group corresponding to the front-direction preset value and configured by the two layers including the varnish ink layer. The processor 110 sets a priority level third highest for a candidate that is the color/white layer group corresponding to the rear-direction preset value and configured by the two layers. The processor 110 sets a priority level lowest for a candidate that is the white/color/varnish layer group configured by the three layers.

The processor 110 selects from the specified candidates one by one as a selected candidate in descending order of the priority levels and performs processing explained below for the selected candidates.

The processor 110 specifies all portions having the same layer configuration as the selected candidate out of portions not determined as layer groups in the imaginary layer. The processor 110 determines the specified portions as layer groups. In this embodiment, first, the processor 110 selects the white/color layer group as the selected candidate. In the example shown in FIG. 5, the processor 110 specifies the second and third layers and the fourth and fifth layers in the imaginary layer as portions having the same layer configuration as the selected candidate and determines the portions as layer groups. Thereafter, the processor 110 considers that a portion having the same layer configuration as the other candidates is absent in portions not determined as layer groups in the imaginary layer and does not determine a layer group any more.

The processor 110 executes the processing explained above for each of the specified candidates to determine a layer group in the imaginary layer.

The processing in the case of the image quality priority mode is as explained above. According to the processing explained above, the processor 110 determines a layer group in the imaginary layer assumed as the printing layer.

The layer-group determining unit 111b is as explained above.

The receiving unit 111a is explained again.

The processor 110 deletes, from the input screen 300, the input regions 310 of layers included in the layer group determined by the function of the layer-group determining unit 111b and adds an input region used for an input of printing conditions for the determined layer group.

Figure 5:
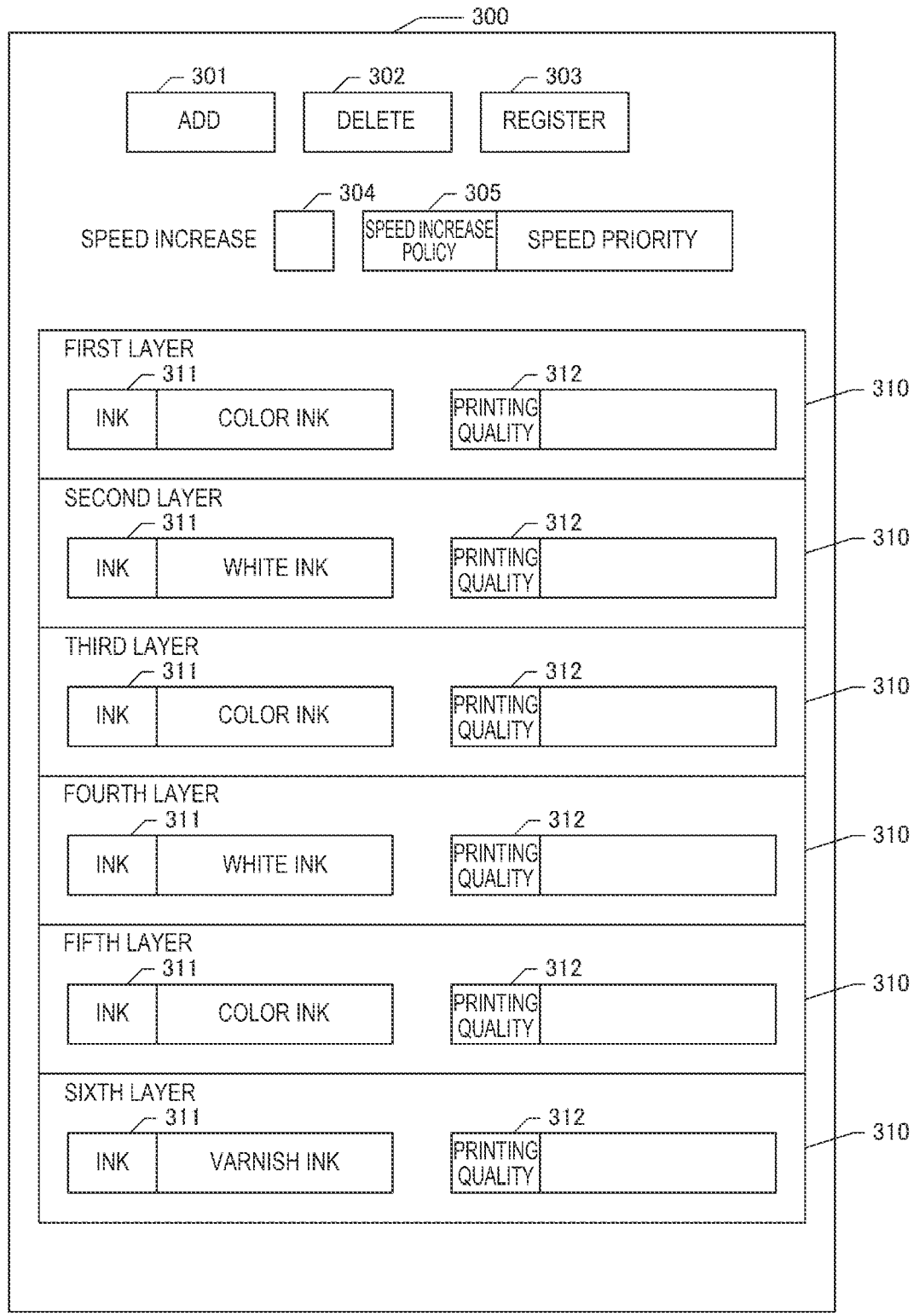
FIG. 5 is a diagram showing an example of an input screen.
Figure 6:
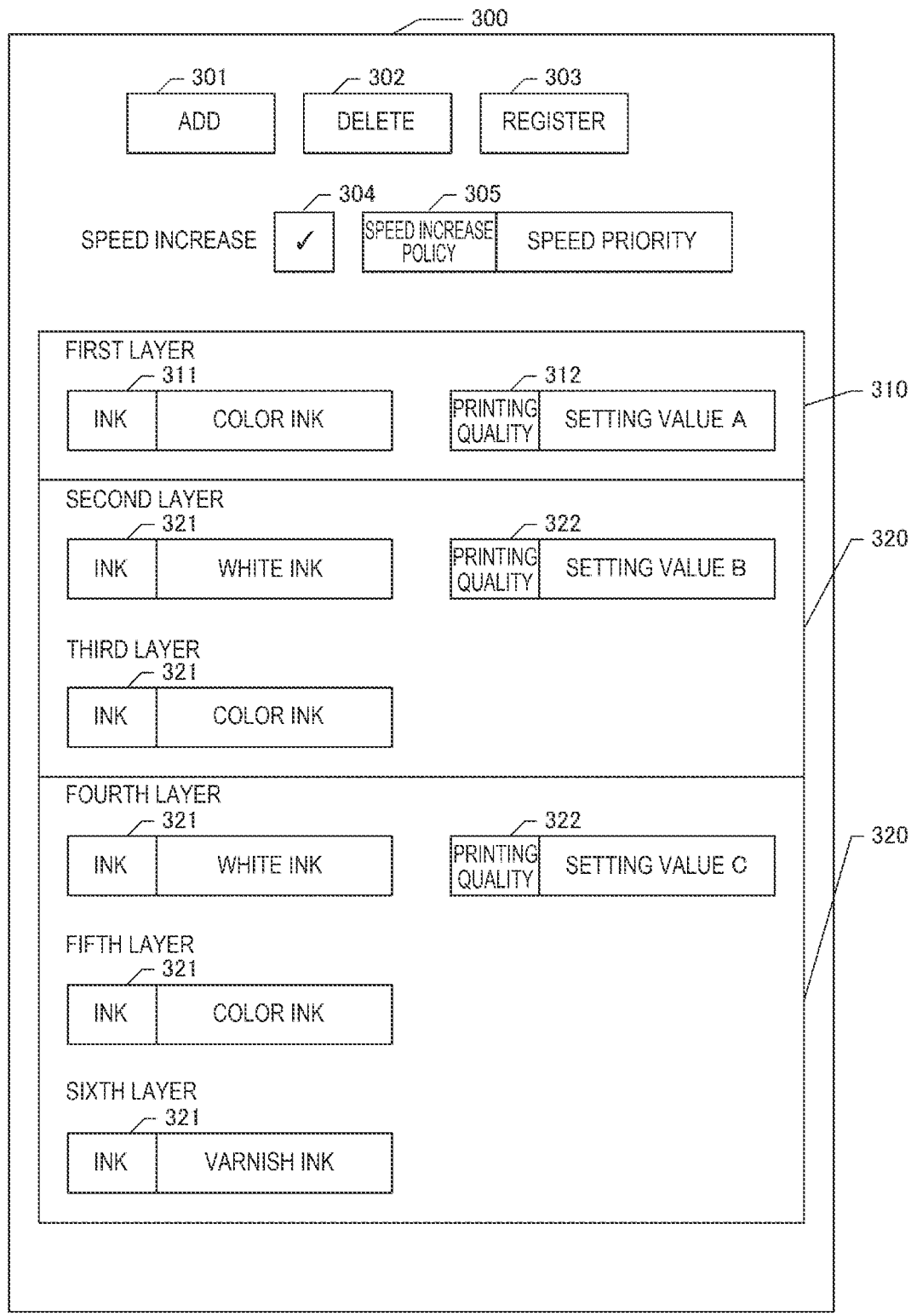
FIG. 6 is a diagram showing an example of the input screen.

In the example shown in FIG. 5, when a layer group is determined in the speed priority mode, the processor 110 deletes the input regions 310 of the second to sixth layers included in the determined layer group of the second and third layers and the determined layer group of the fourth to sixth layers. As shown in FIG. 6, the processor 110 adds, to the input screen 300, an input region 320 used for an input of printing conditions for the layer group of the second and third layers and the input region 320 used for an input of printing conditions for the layer group of the fourth to sixth layers.

The input region 320 includes display fields 321 of types of inks used for formation of layers included in a layer group corresponding to the input region 320 and an input field 322 of a value of a printing condition applied to all the layers in the corresponding layer group. In the display fields 321, the types of the inks input to the input fields 311 of the input regions 310 deleted according to the addition of the input region 320 are displayed. In this embodiment, when detecting selection of the input field 322, the processor 110 presents, as a pulldown menu, choices that can be input as a values of a printing condition applicable to a layer group corresponding to the input field 322. In this embodiment, the processor 110 presents, as the choices, values applicable to the corresponding layer group among the layer group preset values stored in the storage medium 130. The processor 110 receives, via the UI unit 140, designation of a value of a printing condition out of the presented choices. The processor 110 receives the designated value as an input value of a value of a printing condition applied to the corresponding layer group. In an example shown in FIG. 6, concerning the layer group of the second and third layers, a setting value B is input to the input field 322. Concerning the layer group of the fourth to sixth layers, a setting value C is input to the input field 322. A printing condition for a layer group in the imaginary layer input via the input screen 300 (a printing condition indicating an input value input to the input field 322) is an example of the first input value. Printing conditions for other layers in the imaginary layer input via the input screen 300 (printing conditions indicated by input values input to the input fields 311 and the input fields 312 corresponding to the other layers) are an example of the second input value.

Figure 7:
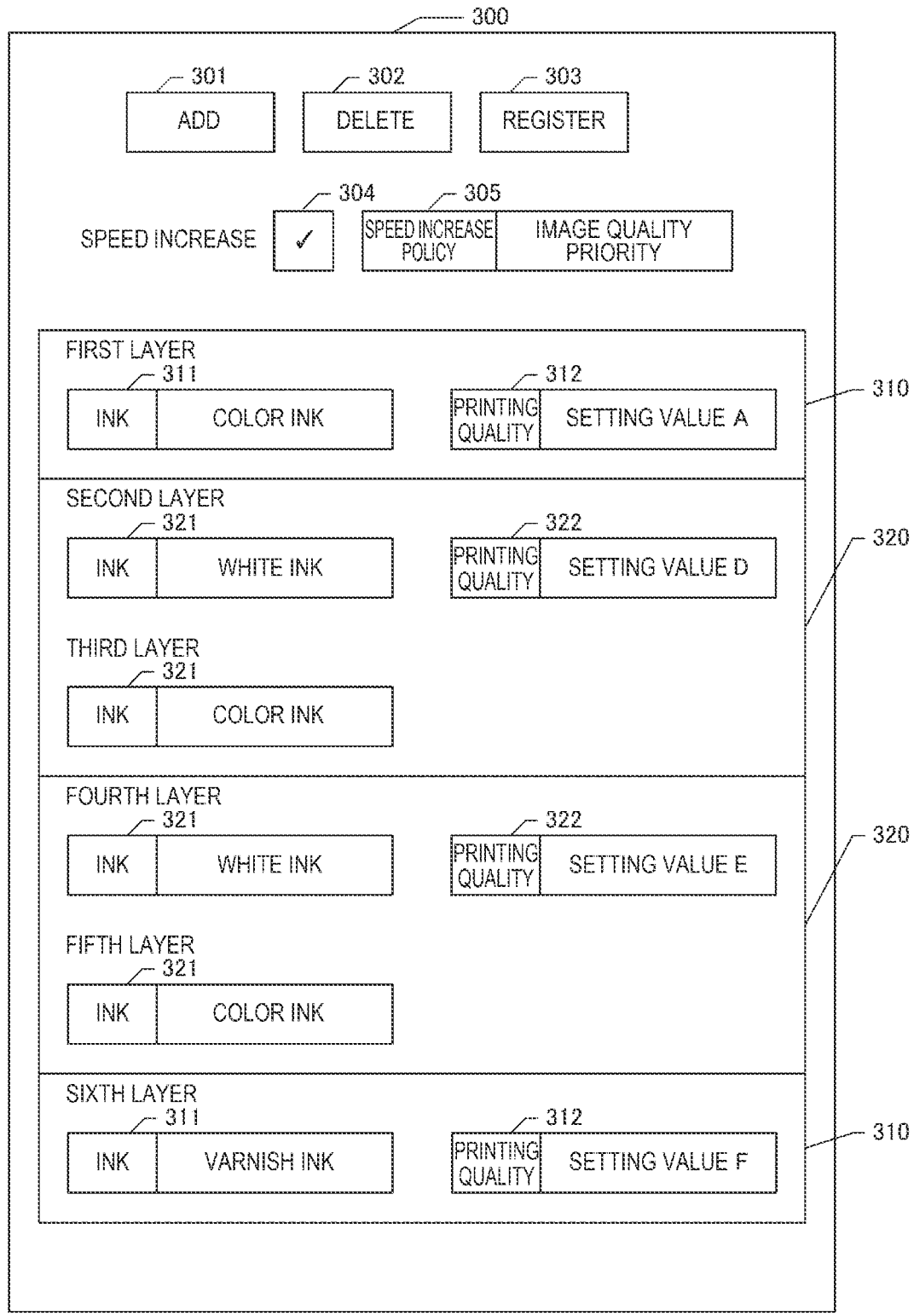
FIG. 7 is a diagram showing an example of the input screen.

In the example shown in FIG. 5, when a layer group is determined in the image quality priority mode, the processor 110 deletes the input regions 310 of the second to fifth layers included in the determined layer group of the second and third layers and the determined layer group of the fourth and fifth layers. As shown in FIG. 7, the processor 110 adds, to the input screen 300, the input region 320 used for an input of a printing condition for the layer group of the second and third layers and the input region 320 used for an input of a printing condition for the layer group of the fourth and fifth layers. In an example shown in FIG. 7, an input region setting value D is input for the layer group of the second and third layers. A setting value E is input for the layer group of the fourth and fifth layers.

As explained above, the processor 110 receives, via the input screen 300, an input of printing conditions for each of the layer group and the other single layers included in the imaginary layer. That is, the processor 110 receives, via the input screen 300, an input of printing conditions for the layers of the printing layer. The processing relating to the function of the receiving unit 111a is an example of the receiving step.

The registering unit 111c has a function of registering, in the storage medium 130, the input values of the printing conditions for the layers of the imaginary layer received by the function of the receiving unit 111a as printing condition preset values that can be set in the printing layer having the same layer configuration as the imaginary layer.

When detecting selection of the registration button 303 via the UI unit 140, the processor 110 performs the following processing with the function of the registering unit 111c. That is, the processor 110 specifies, as printing conditions for layers corresponding to the input fields 311 and 312 of the input regions 310 of the input screen 300, the input values of the printing conditions input to the input fields 311 and 312. The processor 110 specifies, as values of printing conditions for the layer group corresponding to the display fields 321 and the input fields 322 of the input region 320 of the input screen 300, the types of the inks corresponding to the layers in the layer group displayed in the display fields 321 and the input values of the printing conditions input to the input fields 322. For each of the layer group and the zero or more other layers in the imaginary layer, the processor 110 collectively registers the values of the specified printing conditions in the storage medium 130 as printing condition preset values applicable to the printing layer having the same layer configuration as the imaginary layer while including the values in the printing condition setting values 130b.

When detecting the selection of the registration button 303, the processor 110 may receive designation of names of printing condition preset values to be registered and register the printing condition preset values in the received names.

The setting unit 111d has a function of applying, to a layer group of the printing layer, input values of printing conditions input for the layer group and applying, to the other layers in the printing layer, input values of printing conditions input for the other layers.

The processor 110 presents, with the function of the setting unit 111d, to the user, a printing condition preset value that can be set in the image data 130a among the printing condition preset values included in the printing condition setting values 130b. In this embodiment, the processor 110 causes the UI unit 140 to display printing condition preset values for the imaginary layer having the same layer configuration as the printing layer of the image data 130a among the printing condition preset values included in the printing condition setting values 130b. When a printing condition preset value registered by the function of the registering unit 111c is selected based on operation of the UI unit 140 by the user, the processor 110 sets the printing condition preset value to be applied to the printing layer indicated by the image data 130a. That is, the processor 110 specifies, based on the printing condition preset value, a portion set as a layer group in the printing layer. The processor 110 sets a layer group preset value indicated by the printing condition preset value to be applied to the specified portion of the layer group as a printing condition used in printing the layer group. For each of the other layers different from the layer group in the printing layer, the processor 110 sets a printing condition for each of the other layers indicated by the printing condition preset value to be applied as a printing condition in printing the other layer.

When receiving an instruction to print the printing layer indicated by the image data 130a, the processor 110 instructs the printing apparatus 200 to print the layers of the printing layer under the printing condition indicated by the printing condition preset value. At this time, the processor 110 instructs the printing apparatus 200 to print the layer group in the printing layer in one scanning by the printing head 240 under printing conditions (a media profile, an ink concentration value, the number of printing paths, output resolution, and the like) indicated by layer group preset values set for the layer group. The processor 110 instructs the printing apparatus 200 to print the other layers in the printing layer under the printing conditions set for the other layers. The processing relating to the function of the setting unit 111d is an example of the setting step.

Subsequently, a function of the printing apparatus 200 is explained.

The processor 210 of the printing apparatus 200 executes the printing execution program 211 stored in the storage medium 230 to function as a printing executing unit 211a.

The printing executing unit 211a has a function of executing printing of the printing layer on a printing medium according to an instruction of printing from the information processing apparatus 100. The processor 210 prints, with the function of the printing executing unit 211a, according to the instruction from the information processing apparatus 100, the printing layer indicated by the image data 130a on the printing medium under designated printing conditions. The processor 210 forms a layer group in one scanning by the printing head 240 with designated printing quality. In this embodiment, the processor 210 prints the layers included in the printing layer on the printing medium in order from the bottom layer under the designated printing conditions to perform printing of the printing layer.

As explained above, in this embodiment, the information processing apparatus 100 determines the layer group formed in one scanning by the printing head 240 from the printing layer and, for each of the layer group and the other layers, receives the input of the printing conditions and sets the received input values as the printing conditions for the printing layer. By determining the layer group from the printing layer, the information processing apparatus 100 can realize an increase in speed of printing of the printing layer and improve convenience for the user. The information processing apparatus 100 is capable of setting printing conditions desired by the user for each of the layer group and the other layers. That is, the information processing apparatus 100 can set printing conditions for each of the layer group and the other layers, improve flexibility of setting of printing conditions, and improve convenience for the user in multilayer printing. For example, when a printing condition preset value desired by the user is absent in printing condition preset values prepared in advance applicable to the printing layer, the information processing apparatus 100 can set printing conditions desired by the user by receiving an input of printing conditions individually for each of the layers of the printing layer from the user.

The information processing apparatus 100 can print, via the printing apparatus 200, the image data 130a in which registered preset values are set. The user can determine, viewing a printing result, whether image quality, printing speed, color development on the printing medium, concentration of ink, and the like are appropriate. When the user desires to change the printing conditions, the information processing apparatus 100 may receive, again, via the input screen 300, input values of printing conditions that can be set in the printing layer and register new printing condition preset values. Consequently, the information processing apparatus 100 can prepare printing condition preset values closer to the desire for the user.

When the user desires to change conditions (for example, concentration values of inks) relating to printing qualities of the layers of the printing result, the information processing apparatus 100 may perform the following. That is, the information processing apparatus 100 may receive, via the UI unit 140, a value of printing quality desired by the user and generate a new single layer preset value. The information processing apparatus 100 may receive, via the UI unit 140, an instruction to update a parameter of the generated single layer preset value to a value desired by the user. When receiving an input value via the input screen 300, the information processing apparatus 100 may present, again, as a choice that can be input to the input field 312, a preset value of printing quality of a single layer, a parameter of which is adjusted. Consequently, the information processing apparatus 100 can realize printing quality closer to the desire of the user.

In this embodiment, the information processing apparatus 100 determines a layer group from the imaginary layer according to the policy designated in the input field 305. Consequently, the information processing apparatus 100 can switch, according to a desire of the user, a policy for determining a layer group and can improve convenience for the user. When the speed priority is designated in the input field 305, the information processing apparatus 100 can determine a group layer in the imaginary layer to improve printing speed compared with when the image quality priority is designated. When the image quality priority is designated in the input field 305, the information processing apparatus 100 can determine a layer group in the imaginary layer to be capable of suppressing deterioration in image quality compared with when the speed priority is designated.

In this embodiment, the information processing apparatus 100 registers the input values of the printing conditions input via the input screen 300 as the printing condition preset values that can be set for the printing layer having the same layer configuration as the imaginary layer. The printing condition preset values once registered are applicable many times also to different the printing layer having the same layer configuration. Consequently, it is unnecessary to perform work for setting the same printing conditions again after the registration of the printing condition preset values. Convenience for the user is improved. That is, the information processing apparatus 100 can improve convenience for the user.

In this embodiment, in the printing head 240, the nozzles that eject the various inks are disposed in the different positions in the sub-scanning direction. The printing head 240 can eject a plurality of inks in the same scanning. Consequently, the information processing apparatus 100 can form a layer group in one scanning by one printing head 240 and can improve printing speed.

In this embodiment, the printing quality includes the concentration value of the ink and the parameters concerning the printing speed.

Consequently, the information processing apparatus 100 can set, for the layers of the printing layer, concentrations of inks and printing speeds desired by the user.

(1-2) Registration Processing

Registration processing executed by the information processing apparatus 100 is explained with reference to FIGS. 8 and 9. The processor 110 starts processing shown in FIG. 8 at timing when a start of the registration processing is instructed via the UI unit 140.

In step S100, the processor 110 causes, with the function of the receiving unit 111a, the UI unit 140 to display the input screen 300. After completion of the processing in step S100, the processor 110 advances the processing to step S105.

In step S105, the processor 110 determines, with the function of the receiving unit 111a, whether selection of the addition button 301 of the input screen 300 is detected. When determining that the selection of the addition button 301 is detected, the processor 110 advances the processing to step S110. When determining that the selection of the addition button 301 is not detected, the processor 110 advances the processing to step S115.

In step S110, with the function of the receiving unit 111a, considering that one layer is added above the top layer of the imaginary layer, the processor 110 adds and displays the input region 310 corresponding to the added layer in the input screen 300. After completion of the processing in step S110, the processor 110 advances the processing to step S115.

In step S115, the processor 110 determines, with the function of the receiving unit 111a, whether selection of the deletion button 302 of the input screen 300 is detected. When determining that the selection of the deletion button 302 is detected, the processor 110 advances the processing to step S120. When determining that the selection of the deletion button 302 is not detected, the processor 110 advances the processing to step S125.

In step S120, with the function of the receiving unit 111a, considering that the top layer of the imaginary layer is deleted, the processor 110 deletes the input region 310 corresponding to the deleted layer from the input screen 300. After completion of the processing in step S120, the processor 110 advances the processing to step S125.

In step S125, the processor 110 receives, with the function of the receiving unit 111a, for the input regions 310, inputs of types of inks to the input fields 311. After completion of the processing in step S125, the processor 110 advances the processing to step S130.

In step S130, the processor 110 receives, with the function of the receiving unit 111a, an input of a policy for determining a layer group to the input field 305. After completion of the processing in step S130, the processor 110 advances the processing to step S135.

In step S135, the processor 110 determines, with the function of layer-group determining unit 111b, whether selection of the checkbox 304 is detected. When determining that the selection of the checkbox 304 is detected, the processor 110 advances the processing to step S140. When determining that the selection of the checkbox 304 is not detected, the processor 110 advances the processing to step S160.

In step S140, the processor 110 determines, with the function of the layer-group determining unit 111b, whether a check is input to the checkbox 304. When determining that the check is input to the checkbox 304, the processor 110 advances the processing to step S145. When determining that the check is released from the checkbox 304, the processor 110 advances the processing to step S150.

In step S145, the processor 110 determines, with the function of the layer-group determining unit 111b, in a mode corresponding to the policy input to the input field 305, from the imaginary layer, a layer group formed in one scanning by the printing head 240. Details of the processing in step S145 are explained with reference to a flowchart of FIG. 9.

In step S200, the processor 110 specifies, with the function of the layer-group determining unit 111b, as candidates of a layer group determined in the imaginary layer, layer groups to which the layer group preset values stored in the storage medium 130 are applicable. In this embodiment, the processor 110 specifies the four layer groups of the color/white layer group, the white/color layer group, the color/varnish layer group, the white/color/varnish layer group. After completion of the processing in step S200, the processor 110 advances the processing to step S205.

In step S205, the processor 110 determines, with the function of the layer-group determining unit 111b, for each of the candidates specified in step S200, a priority level determined in the imaginary layer as explained below.

In the speed priority mode in which the speed priority is designated in the input field 305, the processor 110 performs the following. That is, the processor 110 sets a higher priority level for a candidate having a larger number of layers. Concerning candidates having the same number of layers, the processor 110 sets a priority level higher for a candidate corresponding to the front-direction preset value than a candidate corresponding to the rear-direction preset value. Concerning candidates having the same number of layers and corresponding to the front-direction preset value or candidates having the same number of layers and corresponding to the rear-direction preset value, the processor 110 sets a priority level higher for a candidate not including the varnish ink layer than a candidate including the varnish ink layer. In this embodiment, the processor 110 determines a priority level highest for a candidate that is the white/color/varnish layer group. The processor 110 determines a priority level second highest for a candidate that is the white/color layer group. The processor 110 determines a priority level third highest for a candidate that is the color/varnish layer group. The processor 110 determines a priority level lowest for a candidate that is the color/white layer group.

In the image quality priority mode in which the image quality priority is designated in the input field 305, the processor 110 performs the following. That is, the processor 110 sets a priority level higher for a candidate that is a layer group including two layers than a candidate that is a layer group including three layers. Concerning candidates having the same number of layers, the processor 110 sets a priority level higher for a candidate corresponding to the front-direction preset value than a candidate corresponding to the rear-direction preset value. Concerning candidates having the same number of layers and corresponding to the front-direction preset value or candidates having the same number of layers and corresponding to the rear-direction preset value, the processor 110 sets a priority level higher for a candidate not including the varnish ink layer than a candidate including the varnish ink layer. In this embodiment, the processor 110 determines a priority level highest for a candidate that is the white/color layer group. The processor 110 determines a priority level second highest for a candidate that is the color/varnish layer group. The processor 110 determines a priority level third highest for a candidate that is the color/white layer group. The processor 110 determines a priority level lowest for a candidate that is the white/color/varnish layer group.

After completion of the processing in step S205, the processor 110 advances the processing to step S210.

In step S210, the processor 110 selects, with the function of the layer-group determining unit 111*b*, as a selected candidate, a candidate not selected as the selected candidate yet and having the highest priority level among the candidates for which the priority levels are determined in step S205. After completion of the processing in step S210, the processor 110 advances the processing to step S215.

In step S215, the processor 110 specifies all of portions having the same layer configuration as the selected candidate out of portions not determined as layer groups in the imaginary layer. The processor 110 determines the specified portions as layer groups. When there is no portion having the same layer configuration as the selected candidate among the portions not determined as layer groups in the imaginary layer, the processor 110 does not determine a layer group. After completion of the processing in step S210, the processor 110 advances the processing to step S220.

In step S220, the processor 110 determines, with the function of the layer-group determining unit 111*b*, whether all of the candidates specified in step S200 are already selected as the selected candidate. When determining that all of the candidates specified in step S200 are already selected as the selected candidate, the processor 110 completes the processing shown in FIG. 9 and advances the processing to step S150 in FIG. 8. When determining that a candidate not selected as the selected candidate is present among the candidates specified in step S200, the processor 110 advances the processing to step S210. The processing shown in FIG. 9 is an example of the layer-group determining step.

Figure 8:
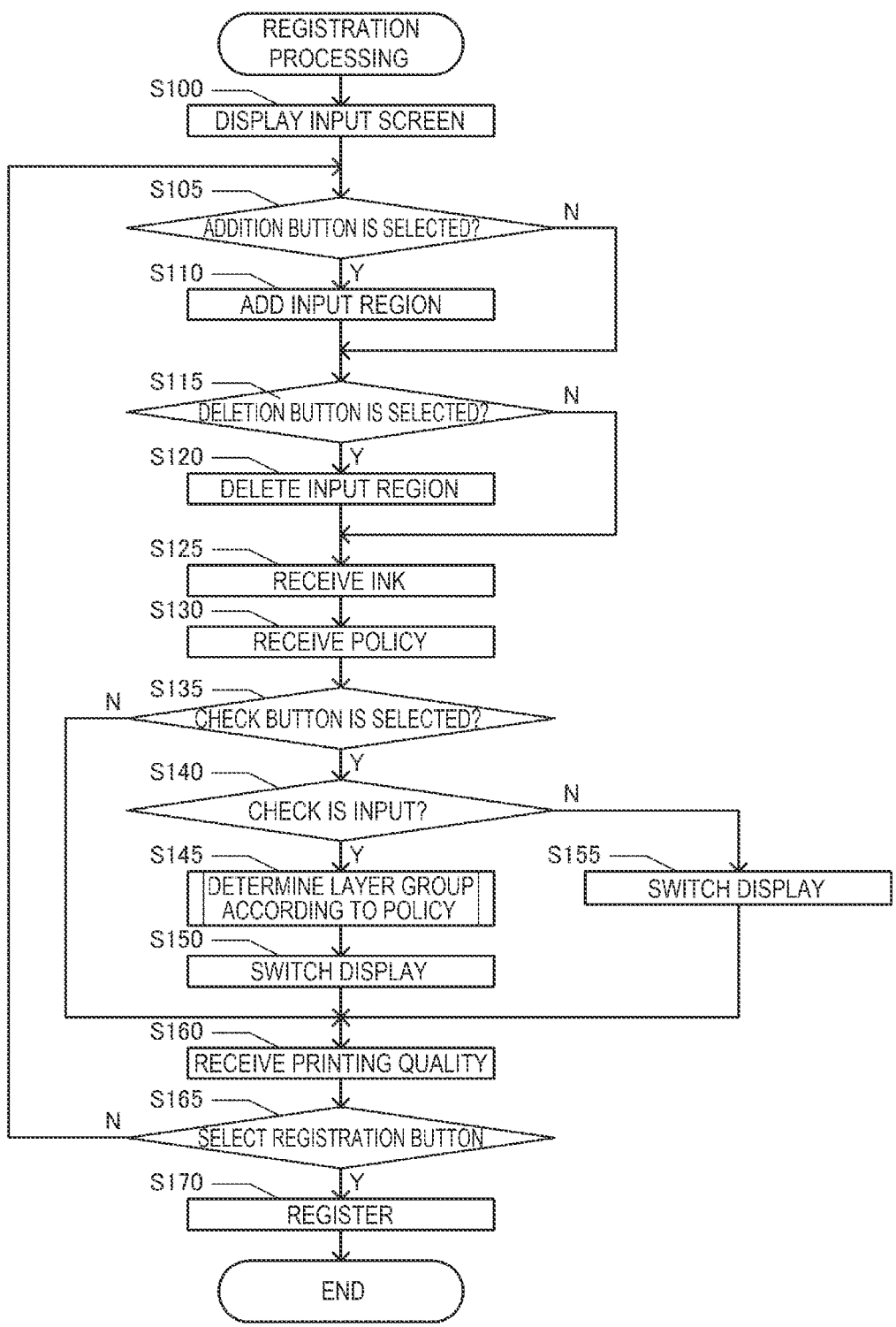
FIG. 8 is a flowchart showing an example of registration processing.
Figure 9:
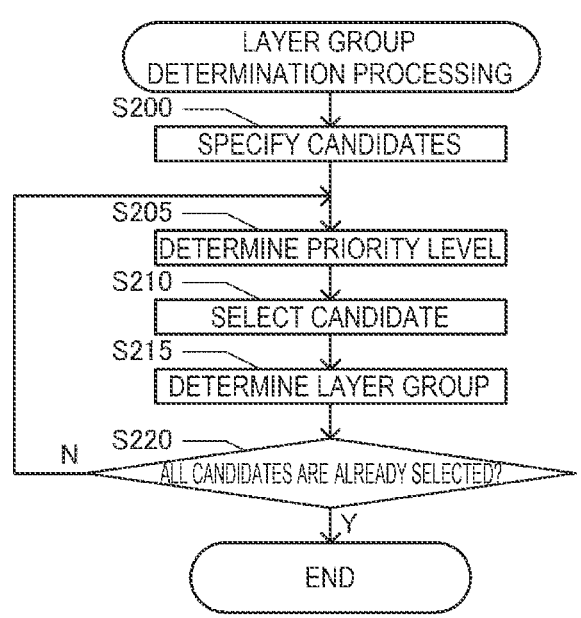
FIG. 9 is a flowchart showing an example of layer group determination processing.

An explanation is referral back to FIG. 8, in step S150, with the function of the receiving unit 111*a*, the processor 110 deletes, from the input screen 300, the input region 310 of layers included in the layer group determined in step S145 and adds the input region 320 used for an input of printing conditions for the determined layer group. After completion of the processing in step S150, the processor 110 advances the processing to step S160.

In step S155, with the function of the receiving unit 111*a*, the processor 110 deletes the input region 320 from the input screen 300 and adds the input region 310 for layers included in the layer group corresponding to the deleted input region 320. After completion of the processing in step S155, the processor 110 advances the processing to step S160.

In step S160, the processor 110 receives, with the function of the receiving unit 111*a*, for the input regions 310, inputs of values of printing qualities to the input fields 312. The processor 110 receives, with the function of the receiving unit 111*a*, for the input regions 320, inputs of values of printing qualities to the input fields 322. After completion of the processing in step S160, the processor 110 advances the processing to step S165.

In step S165, the processor 110 determines, with the function of the receiving unit 111*a*, whether selection of the registration button 303 of the input screen 300 is detected. When determining that the selection of the registration button 303 is detected, the processor 110 advances the processing to step S170. When determining that the selection of the registration button 303 is not detected, the processor 110 advances the processing to step S105.

In step S170, the processor 110 registers, with the function of the registering unit 111*c*, input values of printing conditions for the other layers of the imaginary layer input to the input fields 311 and 312 of the input regions 310 of the input screen 300 and input values of printing conditions for layer groups input to the input fields 322 of the input regions 320 in the storage medium 130 as printing condition preset values that can be set for the printing layer having the same layer configuration as the imaginary layer while including the input values in the printing condition setting values 130*b*.

(5) OTHER EMBODIMENTS

The embodiments explained above are examples for carrying out the present disclosure. Various embodiments can also be adopted besides the embodiments. For example, in the embodiments explained above, the information processing apparatus 100 and the printing apparatus 200 are configured by different apparatuses. However, the information processing apparatus 100 and the printing apparatus 200 may be configured as the same apparatus. For example, the functions of the information processing apparatus 100 may be implemented in the printing apparatus 200. The information processing apparatus 100 may be configured by a plurality of apparatuses. The processing order of the flowchart of FIG. 8 may be different. For example, the order of the processing in steps S105 to S110 and the processing in steps S115 to S120 may be changed.

In the embodiments explained above, the processor 110 receives the input values of the printing conditions for the imaginary layer via the input screen 300 and registers the received input values in the storage medium 130 as the printing condition preset values. The processor 110 presents the registered printing condition preset values as the values of the printing conditions that can be set in the image data 130*a* and, when the printing condition preset values are selected, sets the printing condition preset values in the image data 130*a*.

However, the processor 110 may not register, as the printing condition preset values, the input values received via the input screen 300. In that case, for example, the processor 110 may set input values of printing conditions received via the input screen 300 to be directly applied to the printing layer of the image data 130a.

In the embodiments explained above, the color inks are the inks of the four color of cyan, magenta, yellow, and black. However, the color inks may be inks of three colors of cyan, magenta, and yellow.

In the embodiments explained above, the specific color inks are the white ink and the varnish ink. However, the specific color inks may include other inks such as fluorescent ink and metal ink.

In the embodiments explained above, the processor 110 specifies, as the candidates of the layer group determined in the imaginary layer, all of the layer groups to which the layer group preset values prepared in advance are applicable and specifies, as the layer groups, the portions having the same layer configuration as the specified candidates from the imaginary layer. However, the processor 110 may determine layer groups with another method.

For example, in the image quality priority mode, the processor 110 specifies a layer group preset value having the highest printing image quality among the layer group preset values prepared in advance. The processor 110 specifies, as candidates of a layer group determined in the imaginary layer, layer groups including the color ink layer among layer groups to which the specified layer group preset value is applicable. The processor 110 determines priority levels for the specified candidates. For example, the processor 110 sets a priority level higher for a candidate having a larger number of layers. The processor 110 may select selected candidates one by one from the candidates in descending order of the priority levels, specify a portion having the same layer configuration as the selected candidate from the imaginary layer, and determine the specified portion as a layer group. The processor 110 may input a layer group preset value having the highest printing image quality to the input field 322 of the input region 320 corresponding to the determined layer group. Consequently, the processor 110 can apply printing quality with the highest printing image quality to the layer groups including the color ink layer. Therefore, it is possible to reduce a situation in which printing image quality of an image of the color ink layer is deteriorated.

In the embodiments explained above, in the image quality priority mode, the processor 110 specifies, as the candidates of the layer group determined in the imaginary layer, the layer groups including the varnish ink layer as well. However, in the image quality priority mode, the processor 110 may not specify, as the candidates of the layer group determined in the imaginary layer, the layer groups including the varnish ink layer. Consequently, the processor 110 does not set the varnish ink layer as a target to be included in the layer group determined in the imaginary layer. As a result, the processor 110 can reduce a situation in which printing quality with printing image quality equal to or higher than the predetermined level is unapplicable to the layer group and image quality of a printing result of layers other than the varnishing ink layer in the layer group is deteriorated. Even in that case, in the speed priority mode, the processor 110 may specify, as the candidates of the layer group determined in the imaginary layer, layer groups including the varnish ink layer. Consequently, the processor 110 sets the varnish ink layer as a target to be included in the layer group determined in the imaginary layer. In this case, the processor 110 determines the layer group irrespective of whether the varnish ink layer is included in the imaginary layer. As a result, the processor 110 can set a larger number of layers as the layer group and can contribute to an increase in speed of printing.

In the image quality priority mode, the processor 110 may not set, as the target to be included in the layer group determined in the imaginary layer, the specific color ink layer different from the varnish ink layer such as the white ink layer as well. In this case, for example, the processor 110 may not specify a layer group including the predetermined specific color ink layer as a candidate of the layer group determined in the imaginary layer.

In the embodiments explained above, the processor 110 determines, in the mode corresponding to the policy designated in the input field 305, the layer group from the imaginary layer assumed as the printing layer. However, the processor 110 may determine the layer group in a predetermined mode (for example, the speed priority mode or the image quality priority mode) irrespective of the policy designated in the input field 305. In that case, the input screen 300 may not include the input field 305.

In the embodiments explained above, the processor 110 determines, according to the policy designated in the input field 305, from the imaginary layer assumed as the printing layer, as the layer groups, all of the portions that can be determined as the layer group. However, the processor 110 may determine at least one layer group from the imaginary layer assumed as the printing layer.

Further, the present disclosure is applicable as a program to be executed by a computer and a method. The system, the program, and the method explained above are implemented as an independent apparatus in some cases and are implemented using components included in a plurality of apparatuses in other cases and include various aspects. The system, the program, and the method can be changed as appropriate; for example, a part thereof is software and a part thereof is hardware. Further, the present disclosure also can provide with a recording medium for a program for controlling the system. Naturally, the recording medium for the program may be a magnetic recording medium or may be a semiconductor memory. Any recording medium to be developed in future can be considered completely the same.

The embodiments explained above do not limit the present disclosure. Since the embodiments include a plurality of aspects having different effects, one problem and one effect read from the embodiments are not a problem and an effect for all the aspects included in the embodiments.

What is claimed is:

1. An information processing apparatus comprising:
a processor; and
a memory including one or more programs that, when executed by the processor, cause the information processing apparatus to:
determine, from a printing layer that is a plurality of layers printed using a head that ejects ink, the printing layer including the layer formed by specific color ink and the layer formed by color ink, a first layer group that is a plurality of the layers printed in one scanning by the head, and a second layer group that include at least one layer printer in the other scanning by the head;
display a first input field for the first layer group and a second input field for the second layer group;
receive a first input value of printing conditions for the first layer group via the first input field and a second input value of printing conditions for the second layer group via the second input field; and perform setting for applying the first input value to the first layer group as settings when printing and apply the second input value to the second layer group as settings when printing.

2. The information processing apparatus according to claim 1, wherein the head includes, in different positions in a sub-scanning direction, an ejecting unit for the color ink, an ejecting unit for white ink included in the specific color ink, and an ejecting unit for varnish ink included in the specific color ink and ejects plurality of inks among the color ink, the white ink, and the varnish ink in one scanning.

3. The information processing apparatus according to claim 1, wherein, when the policy of determination of the layer group is designated, the layer group is determined according to the designated policy.

4. The information processing apparatus according to claim 3, wherein, when the policy for prioritizing printing speed is designated, the layer group is determined to prioritize the printing speed over image quality of a printing result.

5. The information processing apparatus according to claim 4, wherein, when the policy for prioritizing the printing speed is designated, the layer group is determined to include the layer formed by varnish ink as a target to be included in the layer group.

6. The information processing apparatus according to claim 3, wherein, when the policy for prioritizing image quality of a printing result is designated, the layer group is determined to prioritize the image quality of the printing result over the printing speed.

7. The information processing apparatus according to claim 6, wherein, the policy for prioritizing the image quality of the printing result is designated, the layer group is determined not to include the layer formed by varnish ink as a target to be included in the layer group.

8. The information processing apparatus according to claim 1, wherein the one or more programs, when executed by the processor, further cause the information processing apparatus to register the first input value and the second input value in a storage medium as preset values of the printing conditions applicable to a printing target having a same layer configuration as the printing layer, wherein
for the printing layer, the preset value selected from registered input values is set.

9. The information processing apparatus according to claim 1, wherein
the printing conditions include printing quality, and
the printing quality includes a concentration value indicating concentration of the ink and a parameter concerning printing speed.

10. An information processing method executed by an information processing apparatus, the information processing method comprising:
determining, from a printing layer that is a plurality of layers printed using a head that ejects ink, the printing layer including the layer formed by specific color ink and the layer formed by color ink, a first layer group that is a plurality of the layers printed in one scanning by the head, and a second layer group that include at least one layer printed in the other scanning by the head;
displaying a first input field for the first layer group and a second input field for the second layer group;
receiving a first input value of printing conditions for the first layer group via the first input field and a second input value of printing conditions for the second layer group via the second input field; and
performing setting for applying the first input value to the first layer group as settings when printing and apply the second input value to the second layer group as settings when printing.

11. A non-transitory computer-readable storage medium storing a program for causing a computer to execute:
determining, from a printing layer that is a plurality of layers printed using a head that ejects ink, the printing layer including the layer formed by specific color ink and the layer formed by color ink, a first layer group that is a plurality of the layers printed in one scanning by the head, and a second layer group that include at least one layer printed in the other scanning by the head;
displaying a first input field for the first layer group and a second input field for the second layer group;
receiving a first input value of printing conditions for the first layer group via the second input field; and
performing setting for applying the first input value to the first layer group as settings when printing and apply the second input value to the second layer group as settings when printing.

* * * * *